Oct. 31, 1933.  F. STONE  1,932,427
WELL PIPE JOINT
Filed June 15, 1931 2 Sheets-Sheet 1
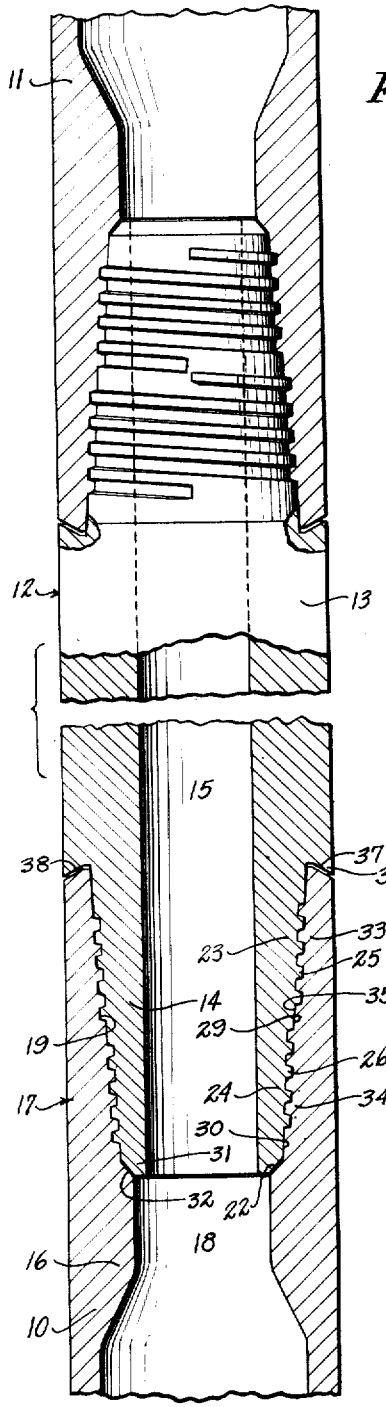
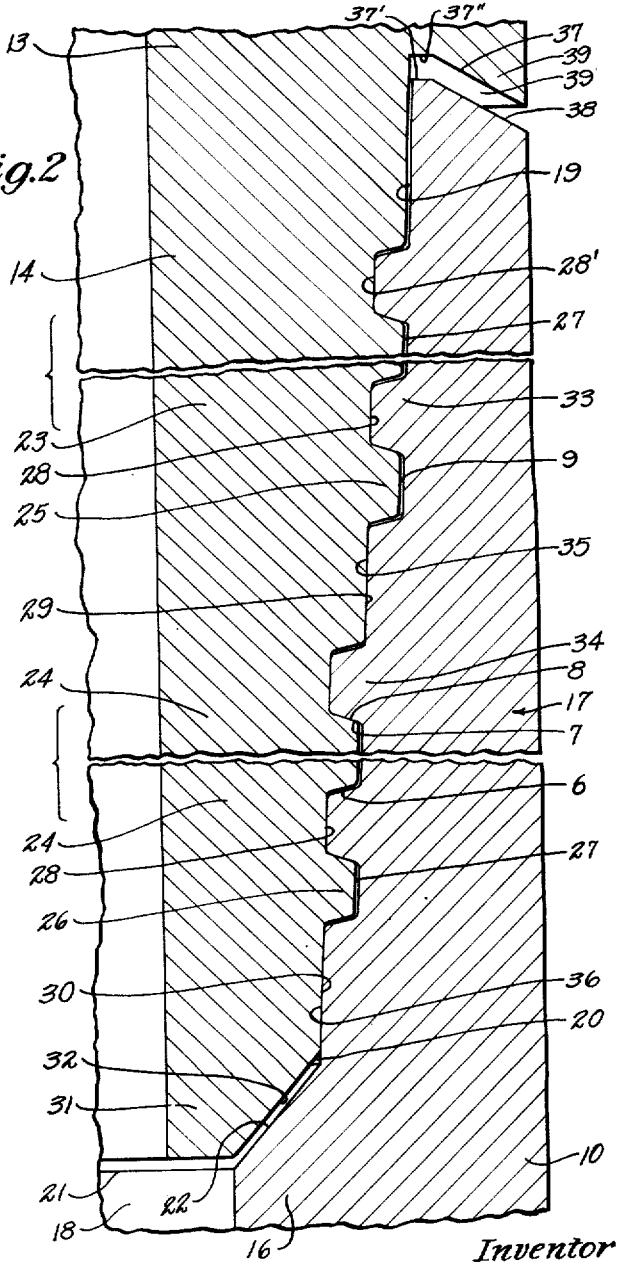
Inventor
Frederick Stone.
Attorney.

Oct. 31, 1933.  F. STONE  1,932,427
WELL PIPE JOINT
Filed June 15, 1931   2 Sheets-Sheet 2
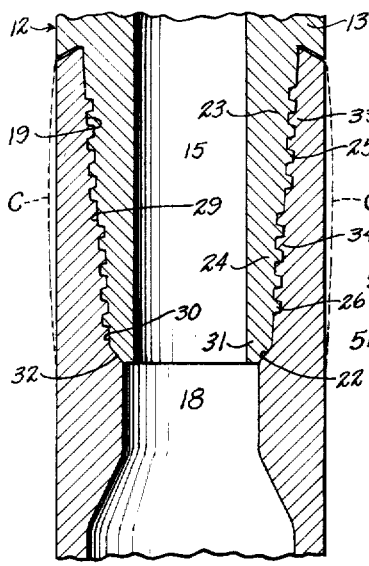
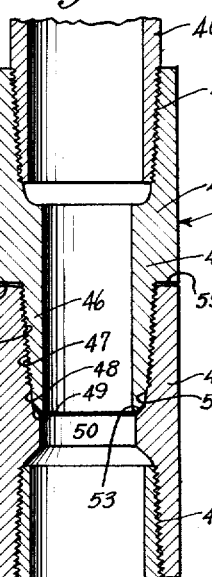
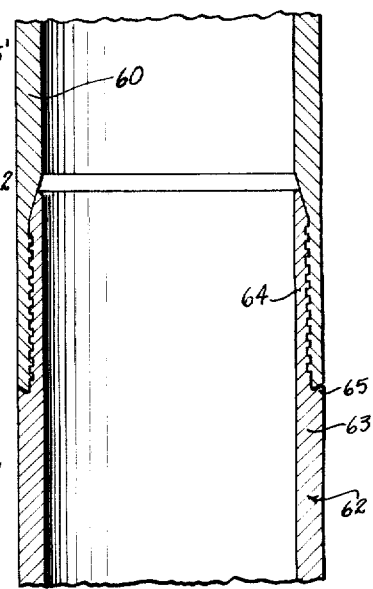
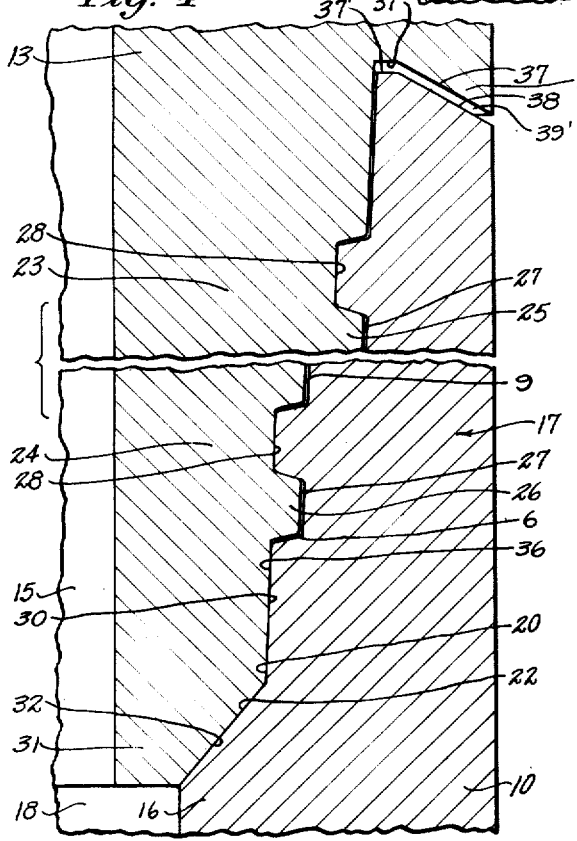
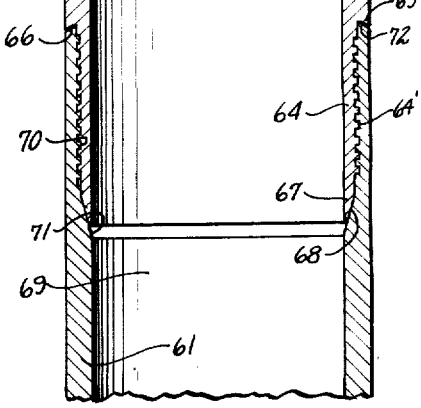
*Inventor*
*Frederick Stone.*
*Attorney.*

Patented Oct. 31, 1933

1,932,427

UNITED STATES PATENT OFFICE 1,932,427

WELL PIPE JOINT

Frederick Stone, Los Angeles, Calif., assignor to Doheny-Stone Drill Co., Los Angeles, Calif., a corporation of Delaware Application June 15, 1931. Serial No. 544,442

13 Claims. (Cl. 285—146)

This invention has to do generally with well pipe joints, and is more particularly concerned with threadably connected joint members of the box and pin type.

The invention, which embodies novel types and combinations of seating shoulders or surfaces on the pin and box members, may be applied with advantage to flush-joint drill pipe, standard tool joints for use in connecting lengths of standard drill pipe, and well casing joints. Its application in these various situations will be set forth in the accompanying specification.

The general objects of the invention are to provide joints which may be made up with ease and dispatch, will mate in fluid tight relationship, and will withstand notably the tremendous torsional strains encountered both in making up the joints with power tongs and under service conditions.

The nature of the invention is such that the means whereby the above mentioned ends are reached, may be discussed to much better advantage as the following detailed description progresses. In this detailed description, certain other novel features and points of advantage will be made apparent.

Reference will be had to the accompanying drawings, in which:

Fig. 1 is a medial sectional view, the pin member being shown partly in section, of an embodiment of my invention as applied to flush-joint drill pipe; showing the joint as it normally appears when made up with hand tongs or with a spinning rope prior to the application of the power tongs. Due to the scale of the drawings, it is impractical to show certain existing clearances, but the clearances are brought out in Figure 2.

Fig. 2 is an enlarged, fragmentary view of a portion of Fig. 1, showing the relative positions of the complementary faces on the box and pin members;

Fig. 3 is a view similar to Fig. 1 except that it shows the relative positions of the box and pin members after the joint has been made up with power tongs;

Fig. 4 is a fragmentary enlargement of a portion of Fig. 3 showing the relative positions of the complementary faces of the pin and box members;

Fig. 5 is a medial sectional view through a standard tool joint and fragments of pipe connected thereby, showing the application of one embodiment of my invention thereto;

Fig. 6 is a medial sectional view through a joint connecting flush-joint well casing, an embodiment of my invention being shown in connection therewith.

I will first describe my invention as applied to tool joints of flush type drill stem, reference particularly being had to Figs. 1 through 4.

As distinguished from standard drill pipe, flush joint drill pipe is made of lengths of heavy tubing, usually up-set internally at its ends, connected by a double-ended pin member, each end of a tubing length being internally threaded to form the "box" of the joint and being adapted to take a threaded extremity of the pin member. The outer peripheral face of the body portion of the pin member is flush with the peripheral faces of the tubing, making it possible to lower, without interference or adjustment, the drill stem through packing rings arranged at the top of the well bore, the use of such rings and the purposes thereof being well understood by those skilled in the art.

Since in making up or breaking down a string of drill pipe a great number of joints must be made or broken, respectively, it becomes of vital importance that the time consumed in making and breaking the individual joints be reduced to a minimum. At the same time, the joint connection must be such that it is fluid tight in order that the relatively high pressures, raised in the bore of the string by the passage of usual circulating fluids therethrough, may be held properly. Furthermore, in making up joints of this character, great torsional strains are imposed upon them during their make-up with power tongs and during the drilling operations.

The joint must be initially set up sufficiently to be fluid tight and to insure that it be not loosened in the hole due to vibrations and shocks incident to drill stem operation. It will also be realized that great torsional strains are put upon the joints during drilling operations, when it is considered that there may be several thousand feet of pipe in the hole, with formation at the bottom of the hole tending to resist rotation and a powerful rotary table at the top of the hole tending to rotate the pipe. It therefore becomes essential that the threaded joint between the box and pin members be of a character which will withstand effectively such strains, without rupture or spreading of the box member at its mouth and without crushing or mutilating the threads. I accomplish the desired end by the arrangement which I will describe, it being noted that in spite of described provisions as regards strength and resistance to strains, the joint may be made up quickly and easily.

In Fig. 1 numerals 10 and 11 indicate lengths of tubing or drill pipe adapted to be connected by the intermediate pin member 12. Since the connections between the two pipe lengths and the pin member are the same, I will describe but one in detail. It will also be understood that while I have shown pin member 12 as "double-ended", in some situations the member threaded into a given length of pipe will carry at its other end a tool or a type of joint differing from the one I am about to describe. Therefore, while I have shown a pin member of the double-ended type, my claims are not to be construed as limited thereto.

Pin member 12 consists of a body portion 13 which is of the same outside diameter as pipe 10, and an axially projecting pin portion 14 of reduced diameter, a bore 15 extending longitudinally through the body portion and pin ends. The end of pipe 10 preferably is upset as at 16 to give added thickness to the walls at their extremities. This upset portion of the pipe will be considered the box member of the joint, though it is to be understood this upsetting is not essential when the walls of the pipe are sufficiently thick. It will therefore be understood that I refer broadly to the end of the pipe which is adapted threadably to receive pin portion 14 as the box member of the joint.

The box member is here generally indicated at 17 and it is provided with a bore 18 and a counter-bore 19, the outer end of the counter-bore opening to the outer end of the box and the inner end 20 of the counter-bore being spaced axially of the box member from the outer end 21 of bore 18. An annular, tapered shoulder or seating face 22 extends from the bore to the counter-bore, thus providing an internal conical seat at the inner end of the counterbore.

It has been pointed out above that it is highly desirable that the threaded connection between the box and pin member be one which may be made up or broken down very rapidly. In the standard type of tool joint, as distinguished from the flush type now being described, this is accomplished by providing a relatively steeply tapered thread on the pin member and a complementary thread in the box member, thus allowing the tapered pin to be dropped freely to a considerable depth into the box without thread interference, whereupon a few turns after the threads are engaged serves threadably to connect the parts fully and from end to end of the threads.

In flush joint drill pipe, however, the thickness of the joint member walls is necessarily reduced considerably below the dimensions found in a standard tool joint. As a consequence, a steeply tapered pin having the desirable longitudinal extent, cannot be provided. I therefore utilize a two-step thread which gives, in the aggregate, a total thread length of desired extent, the relative diameters of the steps being such that the lower step of the pin may be passed without interference through the upper step in the box, though it is only necessary to rotate the pin sufficiently to advance the pin threadably the longitudinal extent of one step in order thereafter to make the joint up fully. I also give each step a slight taper to give a wedging effect which is conducive to a tight final joint, both from the standpoint of mechanical tightness and fluid tightness. However, the degree of this taper is preferably not sufficient to allow the longitudinal "passing" of threads as in the case of the usual steeply tapered thread connection, the taper here being applied for the purposes set out immediately above, while the quick make and break characteristics are given to the joint by virtue of the two-step provision.

In Fig. 1 the upper and larger pin-step is indicated at 23 and the lower and smaller pin step is indicated at 24, the two steps having the same degree of taper. I have found a taper of about ½ inch to 1 foot or about 2½° with respect to the axis of the pin, to be satisfactory.

On the upper and lower step are provided the threads 25 and 26, respectively, these threads preferably being of a modified Acme type having outer peripheral and root peripheral faces, 27 and 28, respectively. At the juncture of the two-steps is a smooth conical portion or face 29 which, in effect, is a tapering continuation of the thread root periphery of the larger step and the outside peripheral thread face of the smaller step. The threads on the upper and lower steps are, of course, matched so when the pin is lowered into the complementary two-step box the threads of the two-steps will simultaneously engage the complementary box threads.

The free end of the pin portion is unthreaded to provide a smooth conical face 30 which is, in effect, a continuation of the thread-root peripheral face, while the nose 31 of the pin portion is tapered complementarily to face or shoulder 22 to provide a seating face or shoulder 32. Preferably, the common degree of taper of faces 22 and 32 is considerably greater than the degree of taper of the major extent of the pin portion. In a joint of the proportions shown in Fig. 1 I have found that very satisfactory results are obtained by inclining faces 22 and 32 at an angle of about 40° with respect to the axis of the pin, whereas, as has been said, the taper angle of the major extent of the pin portion is about 2½°.

The counterbore of the box has two-step characteristics complementary to the pin and is also complementarily internally threaded, the upper threaded step being indicated at 33 and the lower threaded step at 34, a smooth conical face 35 being provided at the junction of the steps and being, in effect, a tapered continuation of the inside thread faces of the upper box step and the thread root faces of the lower or smaller box step. Face 35 is complementary to pin-face 29. The box member likewise has at the inner end of the counterbore a smooth conical face 36 which is complementary to pin-face 30 and is, in effect, a tapered extension of the inside peripheral face of the thread.

Extending from the outer periphery of body portion 13 towards the base of pin portion 14 is an annular shoulder 37 which is adapted to be in opposition with the outer end 38 of box member 17 when the box and pin are threadably connected. Preferably, this shoulder or face 37 is the outer defining wall of a groove 39' which is cut into the end of the body portion, said shoulder inclining in a direction opposite that of nose face 32 and at an angle of about 30°. The end 38 of the box member is tapered complementarily to shoulder 37 to form an external conical shoulder whereby, when the pin and box member are threadably connected, the lip 39, formed by the described grooving of the end of the body portion, overlies end 38 longitudinally of the joint to prevent the box end from spreading under conditions which will be set forth hereinafter.

In making up the joint, the pin portion is dropped through the box until the pin steps engage the complementary box steps, whereupon the pin may be easily and freely rotated to engage threadably until the parts assume the position shown in Figs. 1 and 2. Now, from the description of the threads already given, it will be seen that the average major diameter of threads 26 on the lower or smaller step 24 of pin 14 is substantially equal to the average major diameter of the threads in the upper step 33 of box member 17. This situation, with the added features of the flat-face characteristics of the threads and of there being a continuous tapering effect from bottom to top of pin portion 14, facilitates the "stabbing" operation (dropping the pin end into the box preparatory to making up the joint) by guiding the pin thread into engaging position and pulling the two joint sections into perfect alinement. The pin and mating box elements are so proportioned that the thread root peripheral faces 28 and smooth conical portions 29, 30, of the pin simultaneously seat on the inner peripheral thread faces 28' and conical portions 35, 36, respectively, of the box. The threads are so fashioned, however, that annular clearance space 9, to accommodate foreign matter, is provided between the outer peripheral thread faces of the pin and the root peripheral faces of the box threads. Likewise, while the upper side faces 8 of the pin thread engage the lower side faces 7 of the box thread, there is clearance between the lower side faces of the pin thread and the upper side faces of the box thread, as indicated at 6.

The described thread relationship differs from the customary practice wherein there is usually provided a close fit on both side faces of the thread and annular clearance at both the major and minor thread diameters. Due to inherent inaccuracies of thread cutting tools and the fact that they become rapidly worn so as to give varying thread characteristics, a pin cut on one thread cutting machine will not make uniform contact with both sides of the thread throughout the connection, and consequently only relatively few of the threads near one end of the joint make a snug fit. However, by virtue of the thread relationship specified above, one flat surface of the thread (the root peripheral face of the pin thread and the inner peripheral face of the box thread) is formed as a continuously tapered surface with a consequence that only variations in tapers have to be contended with, and these contentions are not difficult, instead of presenting the problems of taper combined with pitch exact thread-width problems as is true in the general thread practice outlined above.

It is also to be noted that by reason of the described thread relationship, the contacting thread faces 28 and 28' form, in the aggregate, a long taper mandrel effect, giving the beneficial results of extensive friction grip and an even distribution of expanding forces over the full length of the threaded sections.

The pin portion reaches the position of Fig. 2, as described above, when the joint is subjected to what I will term "normal torque strain", meaning by this a strain which does not tend appreciably to displace the metal of the box or pin; the proportions of the mating parts of the pin and box being such that when the conical seating described above has been accomplished, shoulders 22 and 32 are spaced slightly apart, usually from $\frac{1}{32}$ of an inch to $\frac{1}{16}$ of an inch, while shoulders 37 and 38 are spaced apart to a greater extent.

Tong force is then applied to the pin and the threads draw it downwardly into wedging engagement with the box and finally bring nose face 32 into tight engagement with shoulder 22, as indicated in Figure 3. The seating of face 32 on shoulder 22 can only be accomplished with coincident displacement of the metal of the box and/or pin, since the "normal torque strain" previously applied has preliminarily brought faces 28, 29 and 30 into engagement with faces 28', 35 and 36, respectively, and something must yield before further penetration of the pin into the box can be accomplished. It follows that the joint-parts cannot reach the positions indicated in Fig. 3 until they have been subjected to what I will term "more than normal torque strain", that is, sufficient additional torque strain to cause such displacement. Therefore, when this terminology is used in the appended claims it is to be considered as indicating that such displacement is incidental to or occurs in the course of such subjection. However, the terms "normal" and "more than normal" are used in the above sense only, and are not to be considered as otherwise limiting the requisite magnitude of the strain.

The above described engagement of faces 32 and 22 establishes a fluid tight fit between shoulders 32 and 22 and between those conical portions of the pins which have been described as having previously seated on complementary portions of the box, the engaging side faces of the threads also aiding in effecting the fluid seal. Since the conical seating faces 32 and 22 are disposed at a considerable distance from the end of the box, and at a point where the box wall is the thickest, the box-spreading effect set up by the wedging action of the entering pin is reduced to a minimum at an obvious advantage.

By this provision of successively seating faces (first, the long relatively slight taper of the pin portion, proper; second, the relatively steeply tapered faces 32, 22) by subjecting the joint successively to "normal" and "more than normal torque strain", there are gained decided advantages. Among these, may be mentioned the fact that the long, gradual taper of the pin, proper, and the complementary faces on the box member, give the benefits inherent in a long wedge fit so desirable where there is to be no "wobble" of joint parts and where two surfaces are to fit in fluid tight relationship; while the relatively steep taper at the end of the nose serves both as a most effective fluid seal by seating in fluid tight relationship with the box, and to take the longitudinal thrust of the pin and so distribute the strains incident to that thrust that the danger of box rupture or thread mutilation is reduced to a minimum.

As has been previously stated, when the joint has been taken up to seat nose shoulder 32 tightly on internal shoulder 22, there is still left a space between annular shoulders 37 and 38. It may be noted here that the outer end of the box may be relieved as at 37' to eliminate a sharp edge, the bottom of the groove being complementarily relieved at 37''. If, for any reason, the joint be subjected to excessive torque strains, that is, "more than normal torque strain" and of a magnitude greater than that sufficient to engage shoulders 32 and 22 the metal in the box and pin will be further longitudinally and radially displaced to allow shoulder 37 to seat on shoulder 38. Under such conditions, the tendency of the pin is to bulge the box, but due to the fact that lip 39 longitudinally overlies the end of the box, the spreading of the box mouth is prevented and the bulge will take place much as indicated in dotted lines C in Fig. 2. Unless this bulge becomes excessive the joint remains in serviceable condition, whereas if the mouth of the box were allowed to spread the box would either split or its end would be projected radially beyond the end of the pin and all advantage of a flush joint thus lost.

In order to insure that shoulders 37 and 38 will not make up when shoulders 32 and 22 are normally made up, the distance, measured along the axis of the joint, from shoulder 38 to shoulder 22, is less than the distance between shoulder 32 and shoulder 37, this dimensional relationship being set up here as support for certain claim terminology.

As indicative of the great advantages secured through the combination set forth, accurate tests made with a 3½" outside diameter joint with a fluid passage 1½" in diameter, have given the following results. The application of force of between 1000 and 2500 foot pounds torque makes a completely fluid tight joint between shoulders 32 and 22 and between the conical and thread faces previously specified, as meeting prior to the contact of shoulders 32 and 22, still leaving a slight space between shoulders 37 and 38. Shoulders 37 and 38 are not brought into contact or seat until the joint is subjected to severe torque strains exceeding 7500 foot pounds. The joint remains in a serviceable condition under a torque strain of over 18000 foot pounds, (a force well beyond the usual working range) and no rupture or separation of joint parts occurs until the torque load is over 24000 foot pounds.

A joint of the same proportion but have no shoulders functioning as do 32, 22 responds to the same tests as follows. A torque strain of 3500 foot pounds seats the shoulders equivalent to 37, 38, the joint becomes distorted beyond repair when exposed to a torque strain of 8500 foot pounds, and under 12000 foot pounds the joint parts. In other words, the latter type of joint becomes unserviceable when it is exposed to only ½ the torsional strain which my improved joint will withstand. The resulting great merit of the improved joint will be self-evident from this comparison.

In Fig. 5 I have shown an embodiment of my invention applied to a standard tool joint, as distinguished from the flush-joint previously described. However, due to certain inherent characteristics of a standard tool joint, some of the features specified above are somewhat altered.

In Fig. 5, lengths 40 and 41 of drill pipe are detachably connected by the standard type tool joint generally indicated at 42. Tool joint 42 is made up of box member 43 and pin member 44, each of these members having a threaded socket 45' to take the associated drill pipe section 40 or 41. Pin member 44 is made up of body portion 45 and the reduced diameter, axially projecting pin portion 46, the latter being relatively steeply tapered and being externally threaded at 47. The lower or free end of the pin portion is unthreaded to provide a smooth, conical face 48 which terminates in an annular shoulder 49 which is tapered at a steeper angle than is the major extent of the pin portion, including face 48.

Box member 43 has a bore 50 and a tapered, internally threaded, counterbore 51, which latter opens to the outer end of the box member. Counterbore 51 has an internal, unthreaded face 52 which is complementary to face 48, and extending from the bore to the counterbore is an internal annular and conical seat or shoulder 53 which is complementary to face or shoulder 49.

As in the case previously described, the complementary parts of the pin and box are so proportioned that the pin, when threadably connected with the box and subjected to "normal torque strain," first engages face 48 with face 52, there still being a little space between shoulders 49 and 53. When tong pressure is applied to impose "more than normal torque strain" on the pin and thus cause displacement of the metal of the box and/or pin, the nose shoulder 53 is brought down into firmer fluid tight fit with shoulder 49, though the pin and box are so proportioned that there is still left a slight space between the opposing shoulders 54 and 55 on the pin and box, respectively, there being thus avoided any tendency to prevent shoulder 53 from seating on shoulder 49 and any tendency of the box mouth to be spread by reason of longitudinal pressure exerted on shoulder 55.

In the event an exceptionally heavy torque load is placed upon the joint, shoulders 54 and 55 may be brought into engagement by displacement of the metal of the box or pin, but since the box walls are relatively thick at the mouth end (this thickness being allowable since the box stock extends radially appreciably beyond the periphery of pipe 40 as distinguished from the flush joint where the outside diameter of the box is limited by the outside diameter of the pipe) there is little danger of the mouth of the box spreading a dangerous extent, and accordingly it is unnecessary to provide the lip overlap such as is utilized at 39 in the flush joint shown in Fig. 1.

In Fig. 6 I have shown an embodiment of my invention applied to flush joint casing. Since such casing has relatively thin walls, since it is desirable to keep its bore or passageway as unrestricted as possible, and since it is not usually necessary frequently to break or make the joint between casing lengths, the embodiment is here altered or modified in certain respects.

In Fig. 6 casing lengths 60 and 61 are adapted to be threadably connected by double ended pin member 62, though it is to be understood in some situations the two ends of adjacent casing lengths are directly connected together by a joint of the nature to be described. Pin 62 comprises a body portion 63 and reduced diameter, axially extending pin portion 64, there being an overhanging lip 65 at the base of each pin portion, which lip together with its tapered shoulder 66 is similar to lip 39 and shoulder 37, respectively, of Fig. 1.

It will be necessary to describe only one of the pin ends and a box with which that pin mates, since the pin member is symmetrical. Pin portion 64 is externally threaded, as with a modified square thread 64', although this is not controlling. The nose 67 of the pin portion is tapered to provide a smooth conical shoulder 68.

Since the end of the casing here serves as the box member of the joint, the main bore 69 of the pipe or casing will be considered the bore of the box member. Counterbore 70 of the box member is internally threaded to take the threads of pin portion 64, and extending from the inner end of the counterbore to the outer end of bore 69 is an internal annular shoulder 71 having conical characteristics complementary to nose face or shoulder 68. The outer end of the box is tapered to provide an annular, conical shoulder 72 which is complementary to shoulder 66 and is adapted to project beneath lip 65 when the pin and box members are threadedly connected.

The proportioning of the pin and box mating members is such that when shoulder 68 is seated, by the imposition of "normal torque strain" on the joint parts, upon annular seat 71 with fluid tight fit, shoulders 66 and 72 are spaced slightly apart. If, after shoulders 67 and 68 are seated, additional or "more than normal" torque strain of sufficient extent be applied to the joint, the shoulders 72 and 66 will be brought into contact, the overhanging lip 65 then preventing the spreading of the box mouth, as mentioned in connection with Fig. 1.

It may be noted that in all the joints described, when they are taken up to an extent which brings together the outer end of the box and the opposing shoulder of the pin member, such contacts serve to provide an auxiliary fluid seal to check any leakage which may have found its way along the pin by reason of minor failures or loosenesses which may have resulted from taking the joint excessively.

Though threads 64' may be typified generally as square threads, preferably they differ somewhat from true square threads. That is, they are relatively shallow, their depth being only about one half as great as the width of the space between threads. This gives greater tube thickness at the root of the thread, thus contributing to the strength of the casing at the threaded section. Even though these square threads be given normal clearance, the tapered seating faces 68, 71, provide a tightly sealed joint. Thus the advantages of a normal square thread over a taper V-thread are preserved without the usually accompanying loss of a tight seal.

While I have illustrated and described preferred embodiments of my invention, it will be understood that various changes in design, structure and arrangement may be made without departing from the spirit and scope of the appended claims.

I claim:

1. A well pipe joint embodying a box member and a mating pin member, the box member having a relatively reduced bore and a relatively enlarged and internally threaded counterbore, said counterbore opening to the outer end of the box member, an internal annular seating shoulder extending from the bore to the counterbore; said pin member embodying a body portion, and an axially projecting pin portion of reduced diameter, said pin portion being externally threaded to be threadedly taken in said counterbore; an annular shoulder on the pin member at the base of the pin portion and adapted to be in opposition to the outer end of the box member when the joint is made up, a nose at the outer end of the pin portion and having a surface complementary to and adapted to seat on said internal seating shoulder when the joint is made up under predetermined torque strain, the distance between said internal annular seating shoulder and the outer end of tht box member being less than the distance between said nose surface and the annular shoulder on the pin member whereby, when said pin and box members are threadably connected to seat the nose surface on said seating shoulder, the outer end of the box member is spaced from said external annular shoulder, so as to be moved into engagement therewith only when the joint is subjected to additional torque strain of a magnitude to displace the metal of the joint parts, said outer end and said external annular shoulder, in cooperation, being the sole, positive movement-limiting shoulders on the box and pin members.

2. A well pipe joint embodying a box member and a mating pin member, the box member having a relatively reduced bore and a relatively enlarged and internally threaded counterbore, said counterbore opening to the outer end of the box member and the inner end of the counterbore being spaced in the direction of the axis of the member from the outer end of the bore, an internal conical seat extending inwardly from the inner end of the counterbore to the outer end of the bore, the outer end of the box being tapered to provide an external conical shoulder; said pin member embodying a body portion, and an axially projecting pin portion of reduced diameter, said pin portion being externally threaded to be threadably taken in said counterbore, an annular lip on the body portion at the base of the pin portion, said lip presenting a shoulder complementary to and adapted to oppose said external conical shoulder when the joint is made up, a conical nose on the outer end of the pin portion, said nose being complementary to and being adapted to seat on said conical seat when the box and pin members are threadably connected under predetermined torque strain, the distance between the conical seat and said external conical shoulder being less than the distance between said nose and said lip shoulder whereby, when said pin and box members are threadably connected to seat the nose on said conical seat, the said external conical shoulder is spaced from said lip shoulder so as to be moved into engagement therewith only when the joint is subjected to additional torque strain and of a magnitude to displace the metal of the joint parts, said external conical shoulder and said lip shoulder, in cooperation, being the sole, positive movement-limiting shoulders on the box and pin members.

3. A well pipe joint embodying an internally threaded box member and an externally threaded pin member adapted to be threadably connected, an internal seating shoulder on the box member, a complementary seating face on the pin member, an external seating shoulder on the box member and a complementary seating face on the pin member, said internal shoulder and said external shoulder seating on their respective complementary pin-member seating faces in succession and in the order named when said box and pin members are threadably connected, the first seating occurring when the joint is subjected to predetermined torque strain and the second seating occurring when the joint is subjected to additional torque strain of a magnitude to displace the metal of the joint parts.

4. A well pipe joint embodying a box member and a mating pin member, the box member having a relatively reduced bore and a relatively enlarged two-step, tapered and internally threaded counterbore which opens to the outer end of the box member, the inner end of the counterbore being spaced in the direction of the axis of the member from the outer end of the bore, an internal annular and tapered seat extending inwardly from the inner end of the counterbore to the outer end of the bore, the degree of taper of said seat being greater than the degree of taper of said threaded counterbore; said pin member embodying a body portion, and an axially projecting pin portion of reduced diameter, said pin portion being two-step tapered and externally threaded to be threadably taken in said counterbore, and a tapered nose on the outer end of the pin portion, said nose being complementary to and being adapted to seat on said tapered seat when the box and pin members are threadably connected under predetermined torque strains; an external seating shoulder on the box member and a complementary seating face on the pin member, said external shoulder and seating face engaging one with the other when the joint is subjected to additional torque strain of a magnitude to displace the metal of the joint parts.

5. A well pipe joint embodying a box member having a tapered and internally threaded bore and a tapered, externally threaded pin complementary to and adapted to be threadably taken in said bore, an internal annular and tapered seating shoulder in said box member and having a greater degree of taper than said threaded bore, a complementary seating face on said pin member, an external seating shoulder on the box member and a complementary seating face on the pin member, said internal shoulder and said external shoulder seating on their respective complementary pin-member seating faces in succession and in the order named when said box and pin members are threadably connected, the first seating occurring when the joint is subjected to predetermined torque strain and the second seating occurring when the joint is subjected to additional torque strain of a magnitude to displace the metal of the joint parts.

6. A well pipe joint embodying a two-step, tapered pin member, said pin member having a taper, modified Acme thread on each step, the root diameter of the larger step being equal to the outside diameter of the smaller step at the junction of the two steps, a box member having a two-step, tapered and internally threaded bore complementary to and adapted threadably to take said pin member; an internal annular and tapered seating shoulder in said box member and having a greater degree of taper than said threaded bore, and a complementary seating face on said pin member adapted to engage said shoulder when the pin and box members are threadably connected, the threaded portion of the pin member being adapted to expandingly engage the box before said seating face and said shoulder engage one with the other.

7. A well pipe joint embodying a pin member comprising a body portion and a reduced diameter and axially extending tapered pin portion, a thread on said tapered pin portion stopping short of the free end of said pin portion to provide a smooth conical face, an annular shoulder on the free end of the pin portion; a box member having an internally threaded tapered bore complementary to said pin portion and having a smooth, internal conical face at the end of its thread complementary to said smooth pin face, an internal annular shoulder in the box member complementary to said pin shoulder; the smooth conical face on the pin portion seating on the complementary face in the box member when the joint is subjected to normal torque strain, and the annular shoulder on the pin portion subsequently engaging the complementary box shoulder when the box and pin members are threadably connected and are subjected to more than normal torque strain.

8. A well pipe joint embodying a pin member comprising a body portion and a reduced diameter and axially extending tapered pin portion, a thread on said tapered pin portion stopping short of the free end of said pin portion to provide a smooth conical face, a tapered annular shoulder on the free end of the pin portion, the degree of taper of said shoulder being greater than the degree of taper of the threaded pin portion; a box member having an internally threaded tapered bore complementary to said pin portion and having a smooth, internal conical face at the end of its thread complementary to said smooth pin face, an internal annular shoulder in the box member complementary to said pin shoulder; the smooth conical face on the pin portion seating on the complementary face in the box member when the joint is subjected to normal torque strain, and the tapered annular shoulder on the pin portion subsequently engaging the complementary tapered box shoulder when the box and pin members are threadably connected and are subjected to more than normal torque strain.

9. A well pipe joint embodying a pin member comprising a body portion and a reduced diameter and axially extending tapered pin portion, a modified Acme thread on said tapered pin portion stopping short of the free end of said pin portion to provide a smooth conical face, the conical face being a continuation of the taper of the contiguous thread-root periphery, an annular shoulder on the free end of the pin portion; a box member having an internally threaded tapered bore complementary to said pin portion and having a smooth, internal conical face at the end of its thread complementary to said smooth pin face, an internal annular shoulder in the box member complementary to said pin shoulder; the smooth conical face and the thread-root periphery on the pin portion seating on the complementary faces in the box member simultaneously when the joint is subjected to normal torque strain, and the annular shoulder on the pin portion subsequently engaging the complementary box shoulder when the box and pin members are threadably connected and are subjected to more than normal torque strain.

10. A well pipe joint embodying a pin member comprising a body portion and a reduced diameter and axially extending tapered pin portion, a thread on said tapered pin portion stopping short of the free end of said pin portion to provide a smooth conical face, a tapered annular shoulder on the free end of the pin portion, the degree of taper of said shoulder being greater than the degree of taper of the threaded pin portion; a box member having an internally threaded tapered bore complementary to said pin portion and having a smooth, internal conical face at the end of its thread complementary to said smooth pin face, an internal annular shoulder in the box member complementary to said pin shoulder; the smooth conical face on the pin portion seating on the complementary face in the box member when the joint is subjected to normal torque strain, and the tapered annular shoulder on the pin portion subsequently engaging the complementary tapered box shoulder when the box and pin members are threadably connected and are subjected to more than normal torque strain, and an annular lip on said pin member adapted to overlie longitudinally the outer end of the box member when said pin and box members are threadably connected.

11. A well pipe joint embodying a two-step, tapered pin member, said pin member having a tapered, modified Acme thread on each step, the root diameter of the larger step being equal to the outside diameter of the smaller step at the junction of the two steps, a box member having a two-step, tapered and internally threaded bore complementary to and adapted threadably to take said pin member; an internal annular and tapered seating shoulder in said box member and having a greater degree of taper than said threaded bore, and a complementary seating face on said pin member, the root peripheral faces of the pin threads engaging the complementary faces of the box threads and one side face of the individual pin-step threads engaging the complementary faces of the box threads when the joint is made up under normal torque strain, there being clearance between all other complementary faces of the pin and box threads; and said seating face and said shoulder being adapted subsequently to engage one with the other when the joint is subjected to more than normal torque strain.

12. A well pipe joint including an internally threaded box member and an interfitting externally threaded pin member, said box member having an internal seating shoulder and an external seating shoulder, said external shoulder having a face inclined inwardly towards the end of the box member, and said pin member having complementary seating faces arranged to engage sequentially with adjacent shoulders on said box member when the parts are set up, the internal shoulder being the first to engage its complementary seating face, the clearance between the face of the external shoulder of the pin member and the adjacent face of the box member being so proportioned that the faces are engaged before the box member is expanded beyond its elastic limit.

13. A well pipe joint including an internally threaded box member and an interfitting externally threaded pin member, said box member having an internal seating shoulder inclining outwardly toward the end of the box member, and an external seating shoulder, said external shoulder having a face inclined inwardly towards the end of the box member, and said pin member having complementary seating faces arranged to engage sequentially with adjacent shoulders on said box member when the parts are set up, the internal shoulder being the first to engage its complementary seating face, the clearance between the face of the external shoulder of the pin member and the adjacent face of the box member being so proportioned that the faces are engaged before the box member is expanded beyond its elastic limit.

FREDERICK STONE.

CERTIFICATE OF CORRECTION.

Patent No. 1,932,427.  October 31, 1933.

FREDERICK STONE.

It is hereby certified that the above numbered patent was erroneously issued to "Doheny-Stone Drill Co., of Los Angeles, California, a corporation of Delaware," whereas said patent should have been issued to Hydril Company, Los Angeles, California, a corporation of California, as assignee by mesne assignments of the entire interest in said invention as shown by the records of assignments in this office; and that the said Letters Patent should be read with this correction therein that the same may conform to the record of the case in the Patent Office.

Signed and sealed this 12th day of December, A. D. 1933.

(Seal)

F. M. Hopkins
Acting Commissioner of Patents.

nally the outer end of the box member when said pin and box members are threadably connected.

11. A well pipe joint embodying a two-step, tapered pin member, said pin member having a tapered, modified Acme thread on each step, the root diameter of the larger step being equal to the outside diameter of the smaller step at the junction of the two steps, a box member having a two-step, tapered and internally threaded bore complementary to and adapted threadably to take said pin member; an internal annular and tapered seating shoulder in said box member and having a greater degree of taper than said threaded bore, and a complementary seating face on said pin member, the root peripheral faces of the pin threads engaging the complementary faces of the box threads and one side face of the individual pin-step threads engaging the complementary faces of the box threads when the joint is made up under normal torque strain, there being clearance between all other complementary faces of the pin and box threads; and said seating face and said shoulder being adapted subsequently to engage one with the other when the joint is subjected to more than normal torque strain.

12. A well pipe joint including an internally threaded box member and an interfitting externally threaded pin member, said box member having an internal seating shoulder and an external seating shoulder, said external shoulder having a face inclined inwardly towards the end of the box member, and said pin member having complementary seating faces arranged to engage sequentially with adjacent shoulders on said box member when the parts are set up, the internal shoulder being the first to engage its complementary seating face, the clearance between the face of the external shoulder of the pin member and the adjacent face of the box member being so proportioned that the faces are engaged before the box member is expanded beyond its elastic limit.

13. A well pipe joint including an internally threaded box member and an interfitting externally threaded pin member, said box member having an internal seating shoulder inclining outwardly toward the end of the box member, and an external seating shoulder, said external shoulder having a face inclined inwardly towards the end of the box member, and said pin member having complementary seating faces arranged to engage sequentially with adjacent shoulders on said box member when the parts are set up, the internal shoulder being the first to engage its complementary seating face, the clearance between the face of the external shoulder of the pin member and the adjacent face of the box member being so proportioned that the faces are engaged before the box member is expanded beyond its elastic limit.

FREDERICK STONE.

CERTIFICATE OF CORRECTION.

Patent No. 1,932,427.   October 31, 1933.

FREDERICK STONE.

It is hereby certified that the above numbered patent was erroneously issued to "Doheny-Stone Drill Co., of Los Angeles, California, a corporation of Delaware," whereas said patent should have been issued to Hydril Company, Los Angeles, California, a corporation of California, as assignee by mesne assignments of the entire interest in said invention as shown by the records of assignments in this office; and that the said Letters Patent should be read with this correction therein that the same may conform to the record of the case in the Patent Office.

Signed and sealed this 12th day of December, A. D. 1933.

F. M. Hopkins (Seal)   Acting Commissioner of Patents.

CERTIFICATE OF CORRECTION.

Patent No. 1,932,427.                                      October 31, 1933.

FREDERICK STONE.

It is hereby certified that the above numbered patent was erroneously issued to "Doheny-Stone Drill Co., of Los Angeles, California, a corporation of Delaware," whereas said patent should have been issued to Hydril Company, Los Angeles, California, a corporation of California, as assignee by mesne assignments of the entire interest in said invention as shown by the records of assignments in this office; and that the said Letters Patent should be read with this correction therein that the same may conform to the record of the case in the Patent Office.

Signed and sealed this 12th day of December, A. D. 1933.

F. M. Hopkins (Seal)                                              Acting Commissioner of Patents.